United States Patent [19]

Berbeco

[11] 4,455,350

[45] Jun. 19, 1984

[54] CONDUCTIVE LAMINATE SHEET MATERIAL AND METHOD OF PREPARATION

[75] Inventor: George R. Berbeco, West Newton, Mass.

[73] Assignee: Charleswater Products, Inc., West Newton, Mass.

[21] Appl. No.: 442,277

[22] Filed: Nov. 17, 1982

[51] Int. Cl.³ .......................... B65D 73/02; B32B 9/00
[52] U.S. Cl. ................................. 428/322.2; 428/503; 428/530; 428/511; 428/409; 162/138; 156/307.4
[58] Field of Search ............... 428/503, 511, 409, 530, 428/537; 524/910, 911

[56] References Cited

U.S. PATENT DOCUMENTS

| | | | |
|---|---|---|---|
| 2,688,576 | 9/1974 | Ryan et al. | 428/530 X |
| 3,345,248 | 10/1967 | Pounds et al. | 428/503 |
| 3,523,932 | 8/1970 | Aalbeis et al. | 524/910 X |
| 4,002,790 | 1/1977 | Trewiler | 428/530 X |
| 4,093,579 | 6/1978 | DeLapp et al. | 428/503 X |
| 4,156,751 | 5/1979 | Yenni, Jr. et al. | 428/409 X |
| 4,268,583 | 5/1981 | Hendy | 524/910 X |
| 4,301,040 | 11/1981 | Berbeco | 428/317.9 X |
| 4,315,081 | 2/1982 | Kobayashi et al. | 524/910 X |

Primary Examiner—George F. Lesmes
Assistant Examiner—Nancy A. B. Swisher
Attorney, Agent, or Firm—Richard P. Crowley

[57] ABSTRACT

A static-dissipating, synthetic surface-covering sheet laminate material which comprises a plurality of cured, resin-saturated paper sheet materials laminated together under heat and pressure, and which includes a resin-saturated and cured top sheet material having an electrically conductive amount of a polyalkylene glycol, to provide a surface resistivity of the sheet laminate material of about 100 ohms per square inch or less, when tested in accordance with ASTM-0257.

23 Claims, 1 Drawing Figure

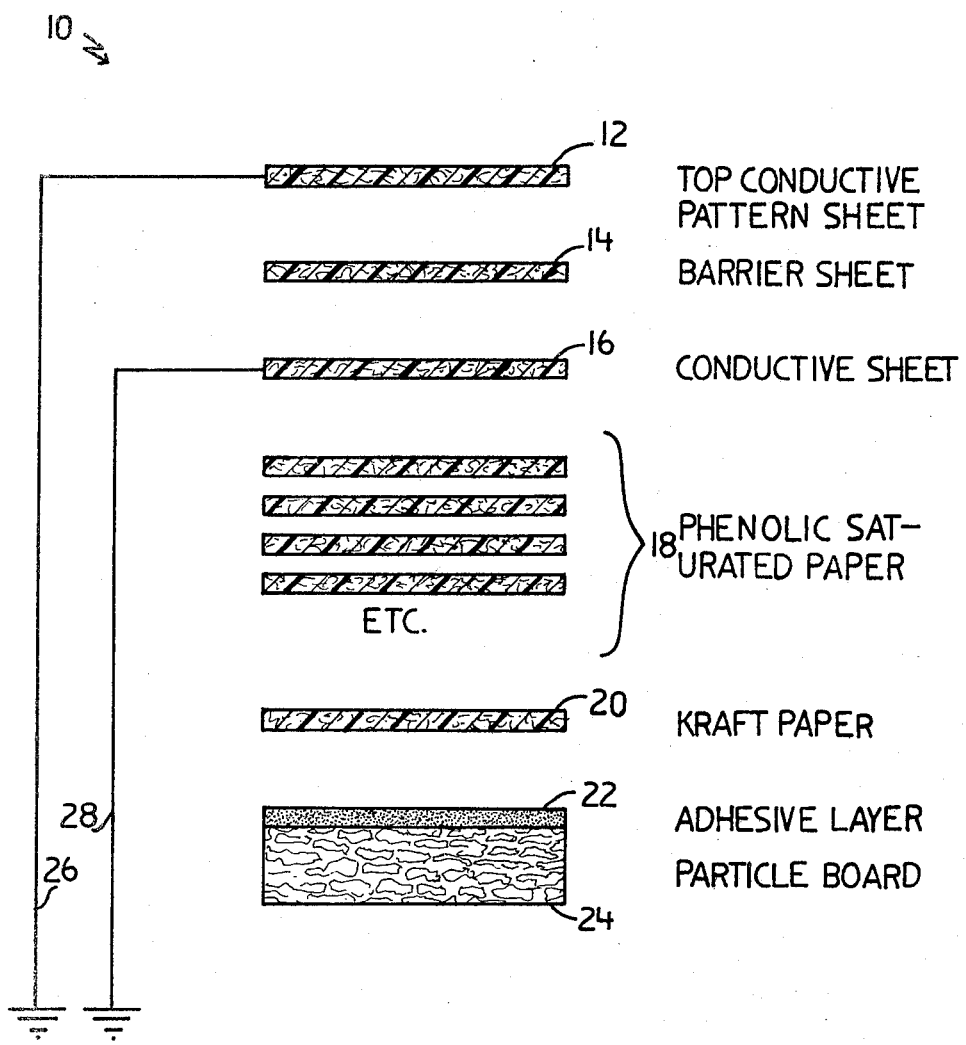

CONDUCTIVE LAMINATE SHEET MATERIAL AND METHOD OF PREPARATION

BACKGROUND OF THE INVENTION

Synthetic film and sheet materials of a conductive nature (approximately $10^9$ ohms per square surface resistivity or less; for example 30,000 ohms) are desirable for use in environments where electronic components, discrete devices, electronic equipment, microprocessors, minicomputers, intelligent terminals, and any electronic equipment containing static-sensitive components may be subject to a static charge. Such charge may be generated by people or the environment, such as shipping, transporting or otherwise moving such electronic components from place to place, utilizing the keyboard on a terminal, both in manufacture of electronic devices and equipment, and in transporting such devices and equipment and in other utilization of such electronic devices and equipment. In electronic manufacturing operations, production personnel utilize inexpensive synthetic materials for floor and work-surface coverings, such material being subject to rapid static-charge buildup and maintenance. Also, in word-processing and data-processing areas, synthetic materials are used in floor coverings. In shipping electronic components and devices, the shipping-room and receiving-room personnel may generate static charges in normal course of business, which may be imparted, in handling, to electronic components or devices. In these environments, conductive sheet materials are utilized and provide a rapid circuit to ground for any static electrical charges that have been built up, both on table and counter areas.

A static-dissipating, synthetic sheet laminate material is described in U.S. Pat. No. 4,301,040, issued Nov. 17, 1981, wherein an electrically conductive layer composed of a polymeric film-forming binder material containing a static-reducing amount of electrically conductive particulate material is applied as a coating on the bottom surface of a sheet laminate material, in order to provide a static-dissipating sheet material. While such back-coating of the sheet laminate material is effective to reduce static, it is desirable to provide an improved laminate sheet material having an improved conductive top surface, which laminate sheet material is easily and economically manufactured.

SUMMARY OF THE INVENTION

The invention relates to an improved static-free sheet material suitable for use as a surface covering and to the method of manufacturing and using such sheet materials. In particular, the invention concerns an improved static-dissipating sheet laminate material composed of a thermosetting polymeric sheet laminate material having an improved top surface resistivity of $10^9$ ohms per square inch or less, when tested in accordance with ASTM-D257, and to the method of manufacturing and using such laminate sheet material.

The sheet material of the invention comprises a synthetic sheet laminate material suitable for a surface covering, such as counter and table tops, and has a hard, washable, synthetic top surface. Such laminate sheet material comprises a resin-impregnated, transparent or printed sheet which forms a top sheet material, which sheet material, either alone or with a plurality of underlying resin-impregnated sheets, provides for a semiconductive or static-dissipating top surface. In particular, the synthetic sheet laminate material of the invention comprises a plurality of resin-saturated, cured paper sheet materials, which include a top sheet material, the sheet materials laminated together in a mold under heat and pressure, to form a hard, thermoset resin laminate sheet material.

The sheet laminate comprises a top sheet material which contains a hydrophilic, electrically conductive material, to improve the electrical conductivity and surface resistivity of the top of the sheet laminate material. The resin-saturated paper sheet material, composing the top sheet material, may be transparent or be a printed or pattern material, depending upon the decorative nature of the top surface. The sheet laminate has one or more top sheet materials, which include an electrically conductive amount of a polyalkylene glycol, such as a polyethylene or polypropylene alkylene glycol, and more particularly having a molecular weight of from about 200 to 1000, so as to provide a surface resistivity of $10^9$ ohms per square inch or less, when tested in accordance with ASTM-D257, such as, for example, a surface resistivity of less than $10^8$ ohms per square inch.

Optionally, the sheet laminate of the invention may comprise a resin-saturated barrier sheet disposed between one or more of the electrically conductive top surface sheets, and the remaining sheets in the sheet laminate, in order to provide a barrier to prevent migration of materials from the top sheet and to the underlying sheets, or to provide a color or white background, when the top sheet is transparent. The sheet material may include a barrier sheet material which is typically a white or light-colored material, so as to provide a pleasing, decorative, transparent or colored top sheet material. The barrier sheet material also prevents the migration of colored components, dark-colored resins or other materials of underlying sheets from contaminating the top sheet material or changing or altering the color thereof.

Optionally, also the sheet laminate material of the invention may include an additional electrically conductive sheet material, typically a resin-impregnated sheet material containing an electrically conductive amount of an electrically conductive compound which may comprise, for example, polyalkylene glycol, such as used in the top sheet material, or more particularly may comprise electrically conductive particulate material, such as carbon black or metallic particles, such as those materials, alone or in combination, with film-forming materials, as employed as a layer coating in U.S. Pat. No. 4,301,040, the disclosure of which is hereby incorporated by reference herein. Where an underlying, electrically conductive sheet material is employed, for example, having carbon black as a particulate material, the barrier sheet is employed to prevent the dark-colored carbon material from contaminating the top surface or to prevent the destroying of the aesthetic effect of the top surface sheet material.

As in conventional formation of thermoset laminate sheet materials, an additional resin-impregnated paper sheet material may be employed as a cushioning layer or to prevent telescoping of defects from the surface of the particle board to the top sheet material, and, therefore, the sheet material may comprise a plurality, such as two, three, four, five or more, thermoset, curable, resin-saturated sheet materials underlying one or more of the electrically conductive paper sheet materials, to provide the desired bulk and thickness. Typically, the additional sheet material comprises a phenolic resin-saturated paper sheet material.

In addition, the bottom of the sheet laminate material may include a kraft paper or heavy paper which may or may not be saturated with resin, and which serves as a bottom surface of the sheet material, so that the kraft paper may be secured through the use of an adhesive layer to the top surface of a particle board or other substrate. In use, the sheet laminate material is secured to a solid particle board or other solid surface which serves as a counter or table top.

The sheet laminate of the invention may include one or more conductive top sheet materials and one or more electrically conductive sheet materials underneath the barrier sheet material. However, generally it is not desirable to employ an electrically conductive sheet material with carbon black as the top sheet material, since the top of the sheet laminate material then will be black and commercially undesirable. Thus, the top sheet material, containing the polyalkylene glycol for reducing static on the top surface of the sheet laminate material, may include a variety of other materials and additives in the resin-saturated paper sheet; however, materials which would change the nature and the color of the top sheet generally are not desirable.

The hydrophilic material suitable for use as electrically conductive materials in the resin-saturated top sheet of the laminate material typically comprises a hydroxyl-containing material, and more particularly includes materials having a plurality of hydroxyl groups and which are compatible with the curable resin employed in saturating the top paper sheet. Higher molecular-weight polyalkylene glycols may be used; however, such materials tend to be solids and should be placed in alcohol solutions or otherwise incorporated into the resin solution used to saturate the paper of the top sheet. The polyalkylene glycols useful in the invention generally have an average molecular weight ranging from about 200 to 1000 and are compatible with curable thermoset resins, such as resins employed in the resin-saturated top sheet material, such as formaldehyde resins like urea or melamine-formaldehyde resins, and phenol-formaldehyde resins employed in sheet laminate materials.

The hydrophilic electrically conductive material employed in the top sheet material should be employed in an amount sufficient to provide for the desired resistivity of the top sheet, after the sheet laminate material is cured and presents a hard, washable top surface. Typically, such amounts may vary, but the amount should be sufficient to provide a surface resistivity of $10^9$ ohms per square inch, when tested by ASTM-D257, or less, such as $10^9$ ohms per square inch or less, and more particularly, for example $10^8$ ohms per square inch of surface resistance or less. The amount of the static-reducing hydrophilic material may vary and may range, for example, from 10% to 90% by weight of the top conductive sheet containing the resin, such as, for example, over 10%, and more particularly about 30% to 70% by weight. The polyalkylene glycol also may be employed alone or in combination with particulate material employed in the underlying electrically conductive resin-saturated sheet beneath the barrier sheet. The particulate material is typically carbon-black or metal particles, such as carbon black having a particle size of less than 200 millimicrons, and typically from 25 to 50 millimicrons, and having a nitrogen surface area ranging from 100 to 2000 square meters per gram.

The curable thermoset resins employed to saturate the paper sheets may be curable or cross-linkable resin or polymer, but generally are formaldehyde-type thermosetting resin compositions, such as melamine formaldehyde, urea formaldehyde and phenol formaldehyde and other methylol-type resins which are subject to curing under heat in the presence of a catalyst. In one embodiment, the top sheet materials, containing the polyalkylene glycols, may include a melamine-formaldehyde resin-saturated paper sheet, while the barrier sheet comprises a white or light-colored melamine-formaldehyde resin-saturated sheet, and the remaining sheets comprise phenol-formaldehyde resin-saturated sheets. Where an electrically conductive sheet employing particulate material is used, the sheet may comprise a melamine-formaldehyde resin-saturated paper sheet. The sheet materials employed in the preparation of the sheet laminate may comprise any fibrous sheet materials which can be saturated with or can absorb the curable resin solution, but more particularly are composed of paper sheet materials which contain and are impregnated with a curable resin, such as from about 5% to 70% by weight; for example, 15% to 50% of the curable resin. The resin is heat-curable and the resin solution includes a catalyst to accelerate the cure of the resin in the heat and pressure conditions employed in the mold in forming the sheet laminate.

The catalyst material used with the resin-saturated sheet materials of the laminate is employed in an amount sufficient to provide for curing fully the resin under the heat and pressure conditions used in preparing the sheet laminate material. Such catalyst may vary in an amount and composition and typically, for example, may comprise Lewis acid-type catalysts, particularly Lewis acid metal salt catalysts, such as aluminum trichloride, borontrifluoride or multivalent metallic salt halides or sulfates, such as magnesium chloride or zinc sulfate, and other catalysts employed in curing thermosetting resins.

The sheet materials of the prior art are typically very nonconductive, but are suitable for use as top surface sheet materials, where a clean room or washable surface is required. Such a hard surface material is commercially provided and sold as a laminate-type material having a hard, transparent, thermosetting resin and a washable, smooth top surface. The resin is impregnated into a series of porous, paper sheets laminated together under heat and pressure, so that the bottom surface presents a rough back surface, such as a kraft paper, which may or may not be impregnated with resin. The bottom surface of the kraft paper may be secured by adhesives or laminations, where resin-impregnated, to other sheets, and particularly to a particle board to make a laminate for a counter-top surface.

The present invention provides for an improved electrically conductive top surface, so that such thermoset sheet laminate may be employed in those environments where a reduction of static charge is essential. The sheet material employed in preparing the sheet laminate may vary in thickness, but typically is paper, and may vary, for example, from 1 to 100 mils; for example, 2 to 20 mils, in thickness, while the kraft paper employed as the bottom layer of the laminate is thicker and may comprise up to 300 mils.

The electrically conductive sheet material, which optionally may be employed below the top sheet material and more particularly below the barrier sheet, uses carbon-black particles to enhance electrical conductivity, since color is not a feature of this sheet. A dark-colored, carbon-black sheet which is resin-saturated and placed beneath the barrier sheet does not affect the appearance of the top surface of the sheet laminate of the invention. However, the use of this electrically conductive sheet or sheets provides for enhanced surface resistivity, alone or in combination with the top electrically conductive sheet material. The electrically conductive sheet is a fibrous sheet material, typically paper which is resin-saturated, so as to bond with and to form an integral portion of the cured laminate sheet material, and may include a film-forming binder material for the particular material used, and includes particulate material, such as carbon-black or metallic particles. If desired, the electrically conductive sheet material may include a polyalkylene glycol or other electrically conductive materials, alone or in combination with the particulate materials, to provide enhanced electrical conductivity.

The improved conductive sheet laminate material of the invention overcomes some of the disadvantages of the prior art and provides for enhanced surface conductivity, by incorporating the electrically conductive layer integrally within and as a top sheet of a thermoset sheet laminate material, while the electrically conductive back-coating composition of U.S. Pat. No. 4,301,040, may be employed with an intermediate sheet in the laminate material of this invention.

The sheet laminate material is prepared by stacking the resin-saturated sheets in the desired pattern and position and, thereafter, placing the sheets in a mold where the sheets are subject to heat and pressure sufficient to form the thermoset laminate material. Typically, the temperatures may range from 225° F. to 450° F. or more, such as 275° F. to 350° F., while the pressure may range from about 500 to 2500 psi or more; for example, 1000 to 1500 psi, over a time period, for example, of 5 minutes to 2 hours; for example, 15 minutes to 1 hour. After removal from the mold, the back surface of the sheet laminate so prepared is then secured to a surface, such as a particle board, through the use of an adhesive layer, such as polyvinyl acetate or other suitable adhesive material, to prepare an electrically conductive counter top or table top surface.

In use, electrically conductive lead wires are placed in the top electrically conductive layer and, where employed in the electrically conductive sheet beneath the barrier sheet, run to a ground path, so that any static charges accumulating on the top surface of the improved laminate sheet material run to ground.

For the purpose of illustration only, the invention will be described in connection with certain embodiments; however, it is recognized that various changes, additions, modifications and improvements may be made by those persons skilled in the art, all falling within the spirit and scope of the invention.

BRIEF DESCRIPTION OF THE DRAWING

The drawing is a schematic illustration of an exploded view of an electrically conductive sheet laminate material of the invention.

DESCRIPTION OF THE EMBODIMENTS

The drawing shows a sheet laminate material 10 of the invention as a counter top, the sheet material shown in an exploded view for the purpose of illustration, to include a melamine-formaldehyde, curable, resin-impregnated, top pattern sheet containing an electrically conductive amount of a polyethylene glycol therein, to impart electrical conductivity to the top sheet. The top sheet 12 comprises a resin-impregnated sheet and includes a Lewis acid-curable catalyst, to cure the resin. The conductive top pattern sheet is printed. A barrier sheet 14 is employed which is impregnated with a melamine-formaldehyde resin, the barrier sheet comprising a light-colored or white sheet top surface. When viewed through the cured transparent top sheet 12, the counter top is seen as a light-colored or white counter top.

An electrically conductive sheet material 16 is employed beneath the barrier sheet 14, the conductive sheet comprising a melamine-formaldehyde resin-impregnated paper sheet which includes dispersed therein finely-divided particulate carbon-black particles uniformly impregnating the paper sheet. The dark-colored carbon-particle-containing sheet may be employed without resin impregnation, with the sheet impregnated by the resin from the barrier sheet or from the underlying other sheets in the stack. However, in the preferred embodiment, all sheets that make up the sheet laminate are impregnated with a curable resin. A plurality, such as from three to eight, or phenolic formaldehyde resin-saturated paper sheets 18, are used beneath the conductive sheet 16, to prevent the telescoping of defects in the particle-board surface 24 to the top sheet 12 and to provide bulk and rigidity to the sheet laminate. The number of phenolic resins saturated may vary as illustrated. The bottom sheet of the sheet laminate comprises a thick kraft paper 20, which may or may not be impregnated with a curable resin. As illustrated, the kraft paper 20 is impregnated with a resin. A particle board 24 is shown having an adhesive layer, such as polyvinyl acetate 22, on the surface thereof, so that, after the sheet laminate of the conductive sheets 12, 14, 16, 18 and 20 is placed in the mold and is formed into a rigid, thermoset, cured sheet material, that sheet material may be secured through an adhesive 22 to the surface of the particle board 24. As illustrated, electrical wires 26 and 28 lead, respectively, to the top conductive sheet 12 and to the conductive sheet 16, and provide an electrically conductive pathway to the ground for static charges accumulating on the laminate sheet material.

EXAMPLE 1

Various high-pressure laminates were prepared by saturating a printed or transparent pattern top paper sheet with the various aqueous solutions as shown in Table I. The top sheet paper, after impregnation and saturation by the solution, was dried at about 250° F. for 15 minutes. The high-pressure laminates were then prepared by stacking the saturated pattern sheet of each formulation on top of a white barrier sheet saturated with a melamine-formaldehyde, curable resin and an acid catalyst, and then five phenolic formaldehyde resin-saturated bottom paper sheets as fillers. The stacked paper sheets were then placed in a mold and the product was cured at about 300° F. at 1200 psi for 25 minutes. The high-pressure laminates so formed were then tested for surface electrical resistivity under ASTM-D257, with the results shown in Table I. Also, formulations 1, 2 and 3 were tested by forming a conductive plastic tote box for electronic components. The tote box so formed was charged to 5000 volts, and the 5000 volts dissipated all of its charge in less than 1 second, when placed on a grounded surface. In contrast, conventional high-pressure laminates, which did not include any polyalkylene glycol in the top pattern sheet, but similarly prepared, had a surface resistivity of $10^{14}$ ohms per square inch, and further did not dissipate the electrical charge from a tote box. Thus, high-pressure laminates prepared in accordance with the invention exhibited significantly improved electrical conductivity.

TABLE I

| Top Sheet Resin Treating Solution | | | | | |
|---|---|---|---|---|---|
| | Weight in Grams | | | | |
| Formulation | 1 | 2 | 3 | 4 | 5 |
| 1. Curable melamine-formaldehyde aqueous resin solution | 100 | 100 | 100 | 200 | 200 |
| 2. Curable dimethylol ethylene urea solution (Permafresh LF-2, a trademark of Sun Chemical Co.) | | | 100 | | |
| 3. Lewis acid-curing catalyst-magnesium chloride | 0.75 | 0.75 | 0.75 | 12 | 12 |
| 4. Ethanol | 1.5 | 1.5 | 1.5 | 1.5 | 1.5 |
| 5. Polyethylene glycol liquid M.W. 600 Carbowax 600, a trademark of Union Carbide Corp.) | 200 | 100 | 100 | 100 | 50 |
| Surface resistivity ASTM-D257 ohms/square inch | $10^8$–$10^9$ | $10^8$–$10^9$ | $10^8$–$10^9$ | $3 \times 10^9$ | $3 \times 10^{11}$ |

The resin treating solution generally has from 25 to 300; for example, 50 to 250, parts of the polyalkylene glycol per 100 parts of the resin solution, and from 0.1 to 25 parts; for example, 0.5 to 15 parts, per 100 parts of resin of a catalyst. An alcohol or other volatile organic solvent may be used for viscosity-adjusting and solubility purposes.

EXAMPLE 2

A 12×12-inch piece of a semirigid, undercured, postformed melamine-formaldehyde, high-pressure laminate was soaked in a treating solution containing 2 ounces of the permafresh LF-2 resin, 3 ounces of polyethylene glycol 600 and 0.5 ounces of magnesium catalyst for 200 hours at room temperature. After such soaking in which the treating solution penetrated the semirigid, porous, postformed, melamine-formaldehyde laminate, the treated laminate was heated at 300° F., to effect cure of the laminate, and then was washed with soap and water and tested for surface resistivity, which was found to be $10^9$ ohms per square inch. Thus, the treating solutions of the invention are suitable for use in treating postformed laminate materials, in order to impregnate the porous, postformable materials. Such postformed laminate materials are often employed in connection with the preparation of counter tops with rounded edges, since such semirigid, postformed materials may be bent or formed prior to heating to effect curing, such as by the use of radiant heaters.

EXAMPLE 3

A high-pressure laminate was also prepared in accordance with the drawing of the invention, wherein the treating solution No. 4 of Table I was employed to saturate a melamine-formaldehyde, saturated pattern-top printed sheet. A white barrier sheet saturated with melamine-formaldehyde resin was also saturated with the treating solution and both were dried at 250° F. All of the resin-saturated, curable paper sheets were then laid up in a mold in the following order, as illustrated in the drawing: a top sheet material, a barrier sheet material, and a conductive carbon-particle-impregnated sheet material which had been saturated with a melamine-formaldehyde resin and catalyst (a conductive carbon-impregnated paper sheet having a thickness of about 7 mils obtained from Mead Corporation) with four layers of phenolic-formaldehyde-impregnated paper. The layer of paper sheets so provided was then placed in a mold and cured at about 300° F. to 325° F. for 30 minutes. The high-pressure sheet laminate so prepared had a surface resistivity under ASTM-D257 of $5 \times 10^8$ ohms per square inch and zero voltage supression; that is, exhibited complete discharge of the voltage of a charged tote box. The electrical resistance of path to ground was also measured through the laminate with a 5-pound, 2½-inch diameter weight placed on top of one electrode placed on the top surface of the top sheet material, and the other electrode placed in the conductive paper layer, and the electrical resistance was found to be $5 \times 10^6$ ohms.

EXAMPLE 4

The high-pressure laminate of Example 3 was repeated, except that the barrier sheet material was not employed. However, the high-pressure laminate sheet material then had a dark color, due to the translucent nature of the top pattern and the dark color of the conductive carbon-impregnated paper sheet. The surface resistivity of the high-pressure laminate so prepared was $10^8$ ohms per square inch, and an electrical path-to-ground measurement, as in Example 1, was $10^5$ ohms.

What is claimed is:

1. In a surface-covering laminate which comprises a plurality of resin-containing, fibrous sheet materials laminated together under heat and pressure to form a thermoset, cured, resin laminate, having a hard top surface, the laminate suitable for use as a surface covering, the improvement which comprises:
   the laminate comprising one or more fibrous sheet materials containing an electrically conductive amount of a polyalkylene glycol in the fibrous sheet materials, to provide a laminate having a top surface resistivity of $10^{10}$ ohms per square inch or less, when tested in accordance with ASTM-D257.

2. The laminate of claim 1 wherein the polyalkylene glycol comprises a polyethylene glycol or polypropylene glycol.

3. The laminate of claim 1 wherein the polyalkylene glycol comprises a polyethylene glycol having a molecular weight of from about 200 to 1000.

4. The laminate of claim 1 wherein the top surface resistivity of the laminate is from about $10^8$ ohms per square inch or less, when tested in accordance with ASTM-D257.

5. The laminate of claim 1 wherein the polyalkylene glycol comprises from about 10% to 90% by weight of the resin-containing fibrous sheet material of the laminate.

6. The laminate of claim 1 wherein one or more of the fibrous sheet materials of the laminate have been treated with a treating solution comprising a curable formaldehyde resin, a catalyst to cure the curable resin on heating and from about 25 to 300 parts of a polyalkylene glycol per 100 parts of the resin solution.

7. The laminate of claim 1 wherein one or more of the fibrous sheet materials of the laminate comprise electrically conductive particles in the fibrous sheet material.

8. The laminate of claim 7 wherein the electrically conductive particles in the fibrous sheet material comprises finely-divided carbon particles.

9. The laminate of claim 1 which includes a top, fibrous paper sheet material saturated with a curable resin and containing an electrically conductive amount of the polyalkylene glycol.

10. The laminate of claim 1 which includes a fibrous top sheet material in the laminate and a resin-saturated fibrous top sheet material containing an electrically conductive amount of a polyethylene glycol having a molecular weight of from about 200 to 1000, to provide a top surface resistivity of $10^8$ ohms per square inch or less.

11. The laminate of claim 1 wherein the laminate comprises one or more light-colored or transparent, cured, resin-saturated, top sheet materials, and which laminate includes a resin-saturated barrier sheet material of light color directly below the top sheet material and laminated thereto.

12. The laminate of claim 11 which includes a fibrous sheet material containing an electrically conductive amount of carbon particles impregnated in the fibrous sheet material, the fibrous sheet material placed beneath the barrier sheet material.

13. The laminate of claim 1 which includes an electrically conductive means extending from one or more of the fibrous sheet materials containing the polyalkylene glycol to an electrical ground.

14. The laminate of claim 1 which includes a top sheet material which forms the top surface of the laminate which comprises a cured melamine-formaldehyde, resin-saturated, paper sheet material containing a catalyst, to effect the curing of the resin, and an electrically conductive amount of a polyethylene glycol, and which laminate includes a light-colored, cured, resin-saturated, barrier paper sheet material directly beneath the top sheet material, and which laminate also includes an electrically conductive, cured, resin-saturated sheet material directly below the barrier paper sheet material.

15. A surface covering which includes the laminate of claim 1 secured to a solid substrate and an electrically conductive means extending from the laminate to an electrical ground.

16. The laminate of claim 1 prepared by soaking a semirigid, undercured, postformed laminate in a treating solution comprising a curable resin, a catalyst to cure the resin and an electrically conductive amount of a polyethylene glycol, to impregnate the semirigid, undercured, postformed laminate with the treating solution, and, thereafter, heating the treated laminate, to effect full cure of the laminate, to provide a hard thermoset laminate.

17. The laminate of claim 16 wherein the treating solution comprises a melamine-formaldehyde curable resin, and the polyakylene glycol comprises a polyethylene glycol having a molecular weight of from about 200 to 1000, the polyethylene glycol present in an amount ranging from about 50 to 150 parts of the polyethylene glycol per 100 parts of the resin solution.

18. In a surface-covering laminate sheet material which comprises a plurality of curable, formaldehyde, resin-saturated, paper sheet materials laminated together under heat and pressure, to form a hard thermoset resin laminate having a top surface, the laminate suitable for use as a surface covering, the improvement which comprises:

the laminate containing a top sheet material which comprises an electrically conductive amount of a polyethylene glycol having a molecular weight of from about 200 to 1000, to provide a laminate having a top surface resistivity of $10^{10}$ ohms per square inch or less, when tested in accordance with ASTM-D257.

19. The laminate of claim 18, which laminate includes a light-colored barrier sheet material and a curable, resin-saturated, electrically conductive, paper sheet material impregnated with finely-divided carbon-black particles, the barrier sheet material disposed between the top paper sheet material and the electrically conductive paper sheet containing the carbon-black particles.

20. A sheet material suitable for use in preparing an electrically conductive laminate, which sheet material comprises a dried paper sheet material saturated with a curable resin, a catalyst to effect curing of the resin on exposure to heat, and an electrically conductive amount of a polyalkylene glycol.

21. The sheet material of claim 20, which sheet material comprises a generally transparent, dried, paper sheet material suitable for use as a top sheet material in a laminate, and which sheet material includes a melamine-formaldehyde curable resin and contains from about 10% to 90% by weight of the sheet material of a polyethylene glycol.

22. The sheet material of claim 20 wherein the dried paper sheet material also includes finely-divided carbon particles.

23. The sheet material of claim 20 wherein the sheet material comprises a dried paper sheet material of a light color suitable for use as a barrier sheet material between a top sheet material and underlying sheet materials in a laminate.

* * * * *